US012685405B2

(12) United States Patent
Schaefer et al.

(10) Patent No.: US 12,685,405 B2
(45) Date of Patent: Jul. 21, 2026

(54) HEATED BEVERAGE SYSTEM IMPLEMENTING MATRIXED VALVES FOR SIMULTANEOUS CONTROL OF TEMPERATURE AND EITHER PRESSURE OR FLOW RATE

(71) Applicant: MIDDLEBY COFFEE SOLUTIONS GROUP, LLC, Seattle, WA (US)

(72) Inventors: Eric Schaefer, Ruston, WA (US);
Frederick Cory Sayre, McKinleyville, CA (US)

(73) Assignee: Middleby Coffee Solutions Group, LLC, Seattle, WA (US)

( * ) Notice: Subject to any disclaimer, the term of this patent is extended or adjusted under 35 U.S.C. 154(b) by 1001 days.

(21) Appl. No.: 17/742,796

(22) Filed: May 12, 2022

(65) Prior Publication Data

US 2022/0369856 A1 Nov. 24, 2022

Related U.S. Application Data

(60) Provisional application No. 63/191,528, filed on May 21, 2021.

(51) Int. Cl.
*A47J 31/52* (2006.01)
*A47J 31/40* (2006.01)

(52) U.S. Cl.
CPC ......... *A47J 31/5253* (2018.08); *A47J 31/402* (2013.01); *A47J 31/5251* (2018.08); *A47J 31/5255* (2018.08)

(58) Field of Classification Search
CPC ................. A47J 31/5253; A47J 31/5251; A47J 31/5255; A47J 31/402

USPC .......................................................... 99/280
See application file for complete search history.

(56) References Cited

U.S. PATENT DOCUMENTS

| | | | |
|---|---|---|---|
| 9,820,605 B2 * | 11/2017 | Coccia ..................... | A47J 31/40 |
| 2002/0130137 A1 * | 9/2002 | Greenwald et al. ..... | B67D 5/62 99/279 |
| 2006/0005712 A1 * | 1/2006 | Greenwald et al. ...... | A23L 1/00 99/275 |

(Continued)

FOREIGN PATENT DOCUMENTS

| | | |
|---|---|---|
| WO | WO 2019/021051 A1 | 1/2019 |
| WO | WO 2020/035736 A2 | 2/2020 |

OTHER PUBLICATIONS

PCT/US2022/029039 International Preliminary Report on Patentability dated Nov. 21, 2023 (1 page) and appended Written Opinion of the International Searching Authority (6 pages) dated Sep. 23, 2022.

(Continued)

*Primary Examiner* — Topaz L. Elliott
*Assistant Examiner* — Solan Oliva
(74) *Attorney, Agent, or Firm* — Crowell & Moring LLP

(57) ABSTRACT

A method of controlling disbursement of a fluid to a brew material, the method includes directing a fluid toward a brew material, wherein the fluid is generated from a first fluid at a first temperature combined with a second fluid at a second temperature. Simultaneously controlling temperature and a flow property of the fluid, wherein the simultaneous controlling the temperature and the flow property is accomplished by simultaneously controlling the flow property of the first fluid and the flow property of the second fluid.

12 Claims, 2 Drawing Sheets

(56)                     References Cited

U.S. PATENT DOCUMENTS

2006/0096465 A1 *   5/2006   Hu et al. ................. A47J 31/40
                                                                     99/280
2017/0360243 A1 *   12/2017  Crowne
2020/0367689 A1 *   11/2020  Illy ..................... A47J 31/5251

OTHER PUBLICATIONS

International Search Report and Written Opinion (11 pages) dated
Sep. 23, 2022 from related PCT Application PCT/US22/29039.

* cited by examiner

HEATED BEVERAGE SYSTEM IMPLEMENTING MATRIXED VALVES FOR SIMULTANEOUS CONTROL OF TEMPERATURE AND EITHER PRESSURE OR FLOW RATE

This application claims under 35 U.S.C. § 119(e) the benefit of the filing date of U.S. Provisional Patent Application No. 63/191,528, filed on May 21, 2021, the entire contents of which are incorporated herein by reference.

FIELD OF THE INVENTION

The present invention is directed to a brewing system that employs a parallel valve matrix for directing a fluid to a brew material, such as coffee.

BACKGROUND OF THE INVENTION

Coffee, as a drink, is nowadays available in many forms. In particular, espresso coffee is a beverage obtained using a coffee machine which forces hot water to pass through a layer of ground coffee, i.e. coffee powder, contained in an infusion container. The water which passes through the layer of ground coffee has to be heated to a certain temperature and is subject to a certain pressure.

It is known to force hot water to pass through the coffee powder by using the pressure generated by such means as a saturated steam boiler, spring-lever machines, single-pump, single-boiler heat-exchanger machines, and machines with electric pumps and two or more boilers. It is known to use a single proportional valve to control temperature, pressure, or flow rate for the hot water. It is also known that the La Spaziale system uses two proportional valves, one controlling temperature and the other controlling pressure or flow rate (each valve responsible for only one control variable). It is also known to use multiple variable pumps for delivering temperate and pressure/flow control of the hot water in real time.

Regarding one or more of the known systems mentioned previously, there are several disadvantages. For example, variable-pump control systems use pump types that have proven to be unreliable in espresso applications. Gear pumps have been used commercially for variable control of flow/pressure, but have a reputation for unreliability. When vibratory pumps have been used for variable control of flow/pressure and for temperature mix control, they have been shown to be very loud and less reliable than the previously mentioned gear pumps.

It is an object of the present invention to provide simultaneous control of output temperature and flow or pressure with a broader output temperature range.

It is another object of the present invention to provide simultaneous control of output temperature and flow or pressure with better precision/accuracy of output temperature.

It is another object of the present invention to provide simultaneous control of output temperature and flow or pressure with greater reliability than known systems can provide.

SUMMARY OF THE INVENTION

One aspect of the present invention regards a method of controlling disbursement of a fluid to a brew material prior to dispensing of a brewed beverage, the method includes directing a fluid toward a brew material, wherein the fluid is generated from a first fluid at a first temperature combined with a second fluid at a second temperature. The method includes simultaneously controlling temperature and a flow property of the fluid being directed toward the brew material, wherein the simultaneous controlling the temperature and the flow property is accomplished by simultaneously controlling the flow property of the first fluid and the flow property of the second fluid.

A second aspect of the present invention regards a system for controlling disbursement of a fluid to a brew material prior to dispensing of a brewed beverage, the system including a first fluid supply having a first proportional valve and a first storage reservoir of a first fluid that is at a first temperature, wherein the first proportional valve is in fluid communication with the first storage reservoir. The system includes a second fluid supply having a second proportional valve and a second storage reservoir of a second fluid that is at a second temperature, wherein the second proportional valve is in fluid communication with the second storage reservoir. A mix manifold that receives and combines the first fluid from the first storage reservoir and the second fluid from the second storage reservoir to generate a fluid that is applied to a brew material. A flow sensor measuring a value of flow of the fluid directed to the first fluid supply and the second fluid supply, a temperature sensor measuring a value of a temperature of the fluid applied to the brew material, and a pressure sensor measuring a value of a pressure of the fluid applied to the brew material. The system includes a control in electrical communication with the first proportional valve, the second proportional valve, the flow sensor, the temperature sensor, and the pressure sensor, wherein based on the values of the flow directed to the first fluid supply and the second fluid supply, the pressure of the fluid applied to the brew material, and the temperature of the fluid applied to the brew material, the following control processes are performed: simultaneously controlling temperature and a flow property of the fluid being directed toward the brew material, wherein the simultaneous controlling the temperature and the flow property is accomplished by simultaneously controlling the flow property of the first fluid via the first proportional valve and the flow property of the second fluid via the second proportional valve.

One or more aspects of the present invention provide the advantage of offering a wider range of output temperatures.

One or more aspects of the present invention provide the advantage of providing greater precision/accuracy of an output temperature.

One or more aspects of the present invention provide the advantage of greater reliability.

BRIEF DESCRIPTION OF THE DRAWINGS

The various features, advantages and other uses of the present apparatus will become more apparent by referring to the following detailed description and drawing in which.

DETAILED DESCRIPTION

As shown in the exemplary drawing figures, an embodiment of system for controlling disbursement of a fluid to a brew material prior to dispensing of a brewed beverage, wherein like elements are denoted by like numerals.

Figure 1:
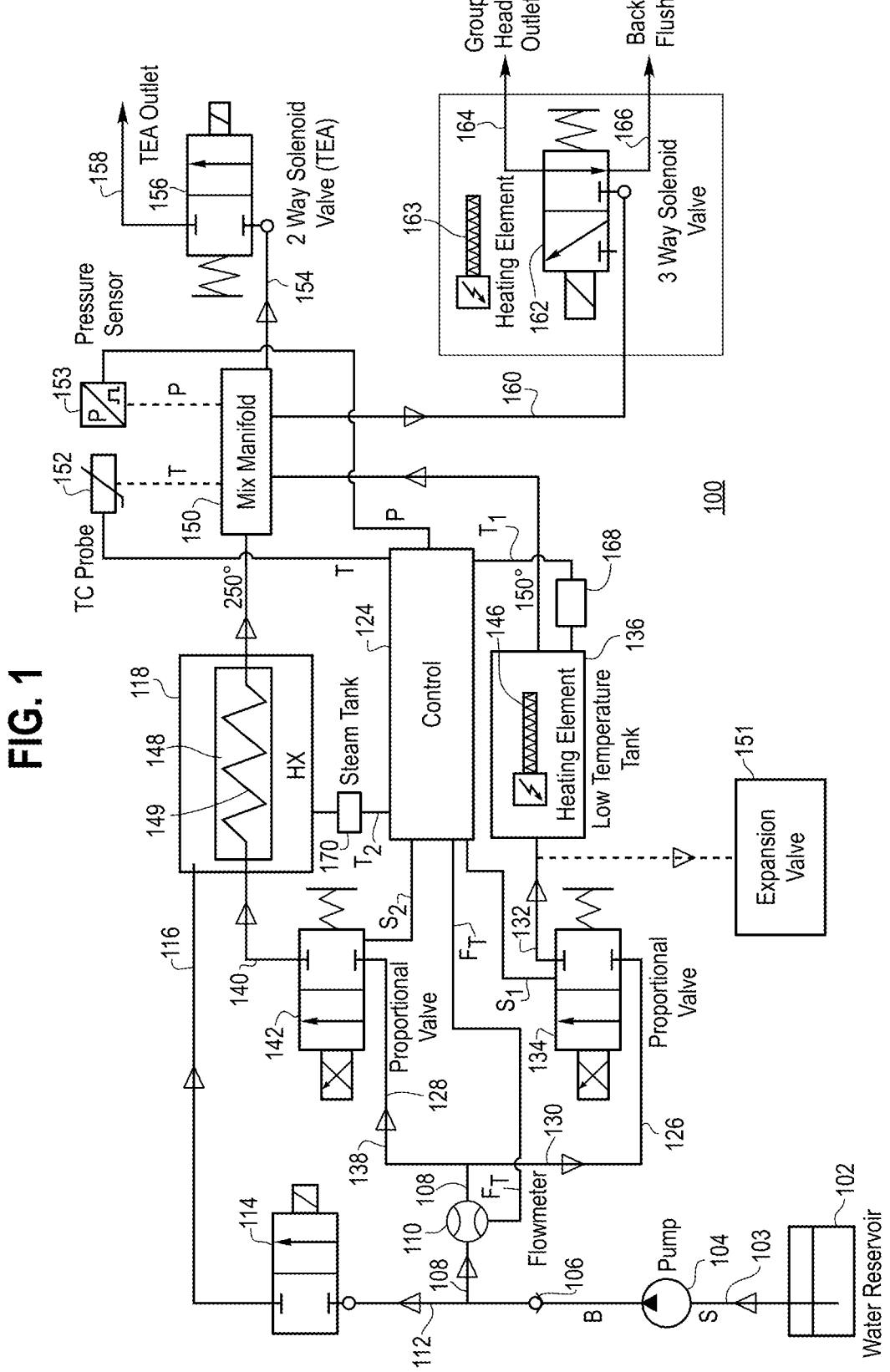
FIG. 1 schematically shows an embodiment of a system for controlling disbursement of a fluid to a brew material in accordance with the present invention.

FIG. 1 schematically shows an embodiment of an embodiment of a system for controlling disbursement of a fluid to a brew material. The system 100 has a reservoir 102 that includes a fluid, such as water. The reservoir 102 has a capacity that can range from 1 to 4 liters. Obviously the capacity can have other values depending the intended use of the system 100. It is also possible to replace the unpressurized reservoir 102 with a water inlet from a pressurized plumbed water supply. A conduit or line 103 is in fluid communication with the reservoir 102 and a pump 104. The conduit 103 can be made of a variety of materials, such as stainless steel, copper, Teflon, PVC, silicone rubber, plastics, and rubber materials and have a diameter ranging from 4 mm to 10 mm. Note that other conduits or lines described herein are preferably made of one of the above described materials or other appropriate materials and have the diameters that may vary depending on their intended use. An example of pump 104 is the pump known by the tradename of GA072 sold by Fluid-O-Tech and capable of delivering the fluid at 10 bar pressure at 30 liters/hr. Of course, it is contemplated that other pumps can be used depending on the intended use of the system 100. The pump 104 will be turned on any time the system 100 and proportional valves 134, 142 are to be active, so inlet pressure at the inlet of the flowmeter 110 is relatively stable during all brew activities described hereinafter. If the system 100 and the proportional valves 134, 142 are not to be active, the pump 104 is turned off.

The pump 104 directs the fluid from the reservoir 102 past a one-way valve 106, wherein a portion of the fluid passes through a conduit 108 and a flowmeter 110. The remaining portion of the fluid passes through conduit 112 and a 2-way solenoid valve 114. An example of the 2-way solenoid valve 114 is the valve known by the tradename of PM126YH-ZB09 230/50-60 sold by Parker.

When the 2-way solenoid valve 114 is in the open position, the fluid flows through the valve 114 and flows through conduit 116 and into a steam tank 118. The 2-way solenoid valve 114 is only in the open position when there is a need to refill the steam tank 118 with water. After the steam tank 118 is refilled, the 2-way solenoid valve 114 is closed. Only when the 2-way solenoid valve 114 is closed is the brew hydraulic circuit, to be described hereinafter, active. This means that when 2-way solenoid valve 114 is open, then water does not pass through flowmeter 110. Similarly, when 2-way solenoid 114 is closed, then water is allowed to pass through the flowmeter 110 and into the remainder of the brew hydraulic circuit.

As shown in FIG. 1 and mentioned previously, another portion of the fluid from pump 104 is directed to the conduit 108 and through flowmeter 110, which measures the total flow rate $F_T$ to be applied during preinfusion and extraction processes to be described hereafter. The flowmeter 110 is in electrical communication with a control 124 that includes a microprocessor that receives a signal from the flowmeter 110 indicative of flow rate $F_T$ measured by a flow sensor, such as the flowmeter 110. The measured flow rate $F_T$ is used by the control 124 to control the temperature and either the flow rate or pressure of the combined brew liquid that flows from mix manifold 150 as will be explained later. The fluid from the flowmeter 110 is split into two fluid supplies, 126, 128. The first fluid supply 126 is defined by conduits 130, 132, a proportional valve 134, and a storage reservoir, such as low temperature tank 136, that are in fluid communication with one another so that a first amount of the liquid is fed from the flow meter 122 to the low temperature tank 136.

The proportional valve 134 is in electrical communication with the control 124 so that the control 124 sends signals to the proportional valve 134 to control the flow rate or the pressure of the fluid flowing out of the low temperature tank 136.

As denoted by the dashed lines in FIG. 1, in the alternative, an expansion valve 151 can be located between the proportional valve 134 and the low temperature tank 136. Such an expansion valve can be located anywhere between outputs of the proportional valves 134, 142 and inputs of the brew/tea valves 156, 162.

As shown in FIG. 1, a second fluid supply 128 is defined by conduits 138, 140, a proportional valve 142, and another storage reservoir, such as heat exchanger 148, that are in fluid communication with one another so that a second amount of the liquid is fed from the flow meter 110 to the heat exchanger 148 positioned within steam tank 118. An example of a heat exchanger 148 is a coiled pipe 149 containing the fluid from proportional valve 142. With respect to the brew hydraulic circuit, the steam tank 110 acts as a heat source so that there is heat transfer between the water within the heat exchanger 148 and the remaining water and the steam in the steam tank 118. For example, suppose the steam tank 118 is half full of water and is heated to anywhere from 250° F. to 275° F. This results in the pressure within the steam tank 118 being limited to around a maximum pressure of 2 bar due to the fixed relationship between temperature and pressure for saturated steam. The pressure and temperature in the steam tank 118 will stay relatively constant in normal operation (even during heavy use, there typically will be no more than a 10° F. drop in temperature). Meanwhile, the path of the water through the heat exchanger 148 is never allowed to drop below 3.5 bar pressure, and typically operates at much higher pressures throughout much of the shot of the brewed beverage. As water flows through the heat exchanger 148, that water heats up—the slower the flow within the heat exchanger 148, the closer the temperature of the water within the heater exchanger 148 will match the temperature of the contents of the steam tank 118.

Note that since the flow rate of the water in the brew hydraulic circuit varies quite a bit through the brewing process, the output temperature of the heat exchanger 148 is also highly variable, but should be somewhere between 220° F. and the temperature of the contents of the steam tank 118. As noted previously, one of the functions of the steam tank 118 is to exchange heat with the water within the heat exchanger 148. This function can be performed by other elements. Accordingly, the steam tank 118 can be replaced with another tank similar to the low temperature tank 136, or could even be replaced by a solid block of heated aluminum with a heat exchanger in it, and the performance of the brew hydraulic circuit and the proportional valve matrix would be the same. In the present embodiment, the steam tank 118 is used, because the steam tank 118 can be used to perform other tasks within the brewing machine that are unrelated to the proportional valve matrix brewing system.

Like proportional valve 134, proportional valve 142 is in electrical communication with the control 124 so that the control 124 sends signals to the proportional valve 142 to control the flow rate or the pressure of the fluid flowing out of the heat exchanger 148. Note that proportional valves 134 and 142 ideally have the property that the valve changes the pressure or flow on its output side in the same ratio that the signal received to change the pressure or flow. For example, if the pressure signal increases by a factor of three, the pressure output by the valve will increase by a factor of three. In reality though, proportional valves on the market are usually somewhat non-linear in response and can obtain the idealized linear behavior when certain downstream loads, restrictions, pressure drops, etc. are present. The bottom line for the proportional valves 134 and 142 is that they are able to react to the received control signals and maintain a stable pressure or flow rate throughout the shot in order to maintain a stable pressure or flow value.

The control signals received by the proportional valves 134 and 142 may change quite a bit through the shot in that the relationship between pressure and flow of the water is determined by many factors, such as flow restrictions (both deliberate and circumstantial) and the resistance to flow from the brew material, such as coffee in a coffee puck, itself (or in the case of the tea faucet, the fixed orifice at the faucet outlet). In the case of a coffee puck, if the coffee of the coffee puck is finely ground or tamped hard, then small valve openings will still deliver high brew pressures. However, if the coffee of the coffee puck is coarse or soft, then it will take much larger valve openings to achieve the same pressures. In any given instant, parameters that the machine can't directly control (like coffee puck resistance and various orifice sizes) dictate only one possible curve describing the pressure/flow rate relationship. In other words, there is only one possible pressure for each possible flow rate and vice versa. However, the coffee puck changes throughout the shot, so the pressure/flow curves will also change constantly throughout the shot. As described herewith, control signals for the proportional valves 134 and 142 will be generated so that the proportional valves 134 and 142 will be able to adapt to the changing conditions.

An example of a suitable proportional valve to be used for the proportional valves 134 and 142 is the proportional valve sold under the tradename 2861 by Burkert, wherein such proportional valve can be driven by 24VDC Pulse Width Modulated control signals.

As shown in FIG. 1, the low temperature tank 136 contains a variable heating element 146 that is in electrical communication with the control 124. The low temperature tank 136 has a temperature sensor 168 that measures the temperature, $T_1$, of the fluid in the tank 136 and which flows to the mix manifold 150. Similarly, the steam tank 118 has a temperature sensor 170 that measures the temperature, $T_2$, of the fluid in the tank 118, which transfers heat to water passing through the heat exchanger 148, which then flows to the mix manifold 150. The measured temperatures, $T_1$, $T_2$, are sent to the control 124, which are used to control the heating elements 146 and 149, respectively, so as to control the temperatures within low temperature tank 136 and the heat exchanger 148 so that the temperatures of the water leaving the tank 118 and the heat exchanger 148 are relatively stable. The control 124 controls the heating elements 146, 148 so that the temperature of the fluids flowing out of the low temperature tank 136 and the heat exchanger 148 are relatively stable. For example, the fluid flowing out of the low temperature tank 136 preferably has a temperature at any one time of 150° F.+10° F./−30° F. Similarly, the fluid flowing out of the heat exchanger 148 preferably has a temperature at any one time of 250° F.±25° F.

Regarding the output from the heat exchanger 148, it is not pure steam, because the pressure of the brew path, up to the point of a ruby-jet flow restrictor located between the mix manifold 150 and a brew valve inlet attached to the group head associated with outlet 164, is not allowed to drop below 3.5 bar. The boiling point of water at 3.5 bar is elevated such that the water will not boil within the heat exchanger 148. On the other hand, water in the steam tank 118 is not artificially pressurized, and its pressure is a function of temperature (values can be found in a well-known manner from saturated steam tables). Note that the ruby-jet flow restrictor is used for some types of proportional valves 134 and 142 in order to enhance performance of such valves.

The above-described control of the temperatures of the water from low temperature tank 136 and heat exchanger 148 is done in their own PID control loops (closed loop temperature control), which are separate from and independent of the proportional valve control system to be described hereinafter.

The fluids from the low temperature tank 136 and the steam tank 118 flow into a mix manifold 150 wherein they are combined to generate a single brewing fluid that is routed to either the tea faucet or the group head via corresponding control valves. The temperature and either of the flow properties of pressure or flow rate of the brewing fluid leaving the mix manifold are controlled by the proportional valves 134 and 142. In particular, as shown in FIG. 1, a temperature sensor, such as thermocouple 152, and a pressure sensor 153 are in electrical communication with the control 124 and measure the temperature, T, and pressure, P, and flow-rate, $F_T$, from flowmeter 110. The measured parameters, T, P, and $F_T$ are used to control the temperature, pressure, and flow rate, respectively, of the combined brewing fluid flowing from the mix manifold 150.

The above-described components can be used to control disbursement of the combined brewing fluid from mix manifold 150 at all times that is to be used later to obtain a brewed liquid. As will be discussed later, a particular control process can be performed during a pre-infusion time period that occurs prior to the combined brewing fluid is infused into the brew material. In particular, the properties of the combined fluid applied to the brew material can be controlled in a real-time manner based at least on or solely on the values of: the flow rate, $F_T$, of the fluid applied to the system 100, the pressure, P, and the temperature, T, of combined brewing fluid from mix manifold 150 and later applied to a brew material. Those three sensor inputs, along with knowledge of the current proportional valve positions of valves 134 and 142, are all that's needed to determine the next proportional valve positions for valves 134 and 142 (preferably updated 10 times per second).

One of the ways to control the properties of the combined brewing fluid flowing from mix manifold 150 and to be later applied to the brew material is via the proportional valves 134 and 142. They act like the rotating handles of a faucet used at home. One of the rotating handles is for cold water at one temperature and the other rotating handle is for hot water at a second temperature. Rotating a handle controls a valve that results in controlling the flow rate and pressure of the water associated with the handle, and which is supplied to the faucet. To generate a desired flow rate, pressure, and temperature for the combined water coming out of the faucet, both handles are adjusted in a well-known manner.

In a similar manner, the proportional valves 134 and 142 are controlled such that a desired pressure, flow rate, and temperature for the combined brewing fluid flowing out of mix manifold 150 can be controlled. Such control is based on a closed loop environment and is accomplished by the control 124 processing the measurements of flow, $F_T$, and the pressure, P, and temperature, T, of the combined brew fluid flowing from the mix manifold 150 and sending control signals based on such measurements to the proportional valves 134 and 142 in a real-time manner. Note that the use of the proportional valves 134 and 142 can allow for wider ranges of temperature and pressure/flow (compared with other systems that use one valve for temperature control, mixing its stream with another water source through a fixed orifice, and use another valve in series for flow/pressure control, like the La Spaziale S50). Furthermore, the use of the proportional valves in parallel provide several benefits. For example, much higher throughput for any given valve size is possible when compared with existing serial systems. A parallel configuration of valves allows the use of smaller valves, which results in greater precision for the low flow rates encountered in espresso brewing.

In summary, the proportional valves 134 and 142 are used to control the temperature and either the flow rate or the pressure of the combined brewing fluid flowing out of mix manifold 150 and applied to the brew material in a real time manner throughout the brewing process. In real time, measurements of the flow rate, $F_T$, the temperature, T, of the combined fluid, and the pressure, P, of the combined fluid, are delivered to the control 124. The processor of the control 124 processes the measurements and generates control signals $S_1$ and $S_2$ that are sent to the proportional valves 134 and 142, respectively. In response to receipt of the control signals $S_1$ and $S_2$, the proportional valves 134 and 142 are adjusted so that the combined fluid from the mix manifold 150 to be delivered to the brew material has a desired temperature and either a desired pressure or a desired flow rate. As will be explained later, the desired end result is that a constant flow rate through most of the shot is achieved, wherein there is necessarily a flow rate above the desired flow rate during the pre-infusion portion of the process.

As shown in FIG. 1, the brewing liquid from mix manifold 150 is fed to either a 2-way solenoid valve 156 via conduit 154 or a 3-way solenoid valve 162 via conduit 160. When tea is desired by a user, then 3-way solenoid valve 162 is closed relative to conduit 160 and 2-way solenoid valve 156 is in an open position. In this scenario, the brewing water from mix manifold 150 proceeds to a tea outlet 158. The tea outlet 158 is literally like a faucet from a kitchen sink and dispenses hot water at controlled temperatures into a container, such as a cup, a mug, a bowl, etc. Prior to or after dispensing the hot water into the container, the user inserts a material to be mixed with the hot water, such as tea. Note that it is possible that the water in the heat exchanger 148 could boil if a pressure of around 3.5 bars and above cannot be sustained while dispensing tea to a consumer. It is contemplated that a flow restrictor could be used as part of the tea dispensing system in order to sustain pressures of approximately 2 bars and above.

When a coffee product is desired by a user, then a well-known portafilter (not shown and common to all traditional espresso machines), associated with outlet 164 is disconnected so that the coffee therein is cleaned out and replaced with fresh coffee. The portafilter holds a removable metal filter basket, which in turn holds coffee. The user must grind coffee, put it in the basket, level the bed of coffee, and tamp the coffee to have a level, compressed surface of fairly consistent density. Then, the portafilter is securely attached to the group head, typically by means of a "bayonet" mount where you lift the portafilter into an opening in the group head, and then rotate it roughly 30-45 degrees in order to lock it securely in place.

After the portafilter is reconnected to the group head and the 2-way solenoid valve 156 is closed relative to conduit 154, the 3-way solenoid valve 162 is placed in an open position so that the brewing liquid from mix manifold 150 enters the portafilter, wherein espresso will brew in the portafilter. The outlet 164 shown in FIG. 1 is the region where the brewing liquid from the mix manifold 150 exits the main portion of the group head and enters the portafilter basket to wet, saturate, and eventually extract the coffee. When the brewing water from mix manifold 150 initially enters this region, there is essentially no pressure present. This phase of dispensing brewing water in the region when there is essentially no pressure present is deemed a "pre-infusion" phase.

As mentioned previously, certain types of proportional valves 134, 142 used work more efficiently when they encounter a back-pressure. For such proportional valves, a small flow restrictor, such as a piece of ruby with a 0.6 mm diameter orifice located in the brew valve assembly is present to supply such back-pressure during the "pre-infusion" phase. When such a ruby flow restrictor is used, the pressure P mentioned previously is measured before the ruby flow restrictor and the measured valued is sent to the control 124. As mentioned previously, the ruby restrictor can be located in other places, such as between the mix manifold 150 and the coffee puck.

After the "pre-infusion" phase, the region becomes pressurized once all air is forced out of the region and fills with water. Once the coffee is saturated and the air displaced, coffee will begin to provide much more flow resistance than the ruby-jet alone and it will become the dominant factor in the pressure/flow relationships.

At the end of the pre-infusion phase, an extraction phase is entered in which water flows through the group head, through the coffee puck, and falls continuously out of the bottom of the portafilter into a container, such as a cup or a mug. To end the extraction phase, 3-way solenoid valve 162 is closed in order to stop the supply of fresh hot water from mix manifold 150 into the coffee puck. The ports on the 3-way solenoid valve 162 function such that when a port is closed to block water flow from the mix manifold 150, the valve 162 simultaneously opens a path from the coffee puck to the discharge path 166, thereby immediately relieving any pressure that would otherwise remain temporarily in the coffee puck. This immediate release of pressure makes it safe for the user to remove the portafilter immediately. Once the 3-way solenoid valve 162 is closed, the portafilter can be removed, the portafilter cleaned, and the old coffee replaced by fresh coffee so that another shot of espresso can be dispensed when desired. Note that it is well known that the discharge path 166 can also be used to back-flush the water through part of the group head and brew valve during a well-known cleaning process.

With the above described control of the parameters of the combined fluid applied to the brew material generally understood, a particular pre-infusion control process will now be discussed in relation to an example of a real-time pre-infusion process shown by the graph in FIG. 2. Three parameters are plotted as a function of time (x-axis (in seconds)). In particular, the line labeled A regards the pressure, P, of the combined liquid that is applied to the brew material via the proportional valves 134 and 142 and which is measured by the pressure sensor 153. The line labeled B regards a preferred progression for the flow rate of the combined liquid that is applied to the brew material via the proportional valves 134 and 142. The line labeled C regards the flow rate of the combined liquid applied to brew material via the proportion valves 134 and 142 as measured by flow meter 110.

Figure 2:
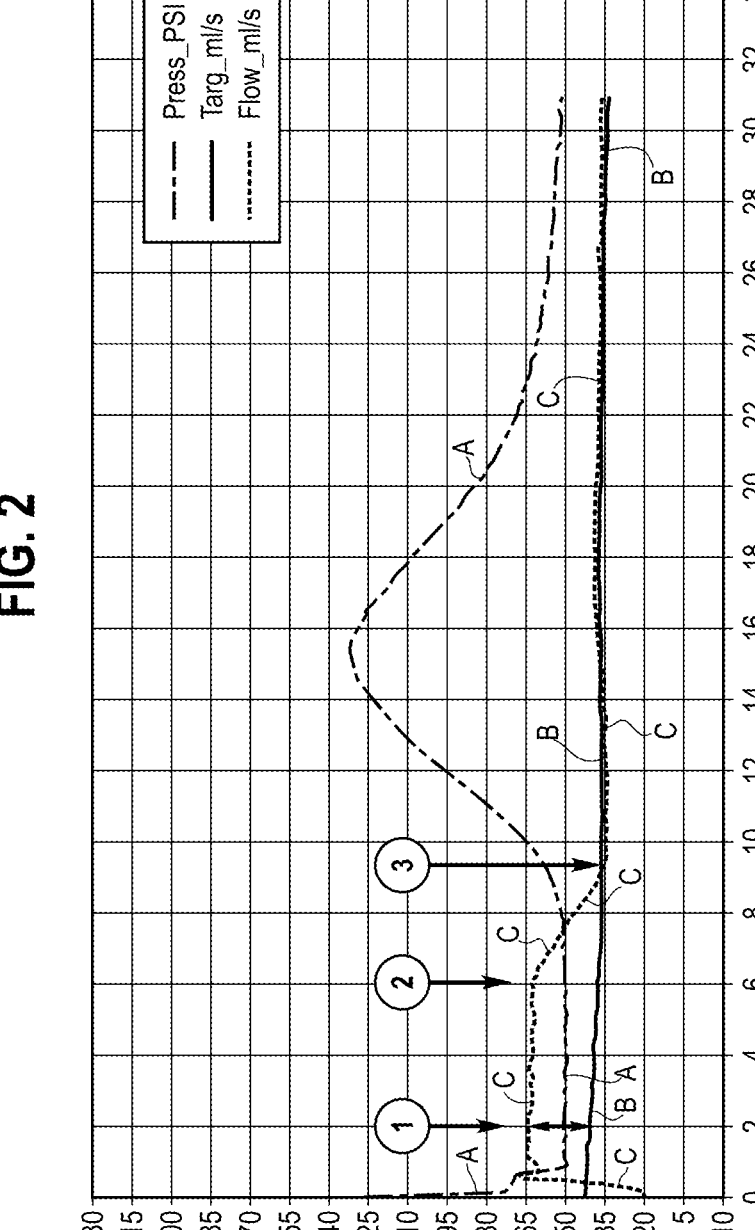
FIG. 2 shows a graph demonstrating a possible method for controlling disbursement of a fluid to a brew material using the system of FIG. 1 in accordance with the present invention.

In the example shown in FIG. 2, from t=0 s (startup of system) to t=2 s (see circle1), the measured pressure of the combined brewing fluid (see line A) is essentially uncontrolled between the minimum pressure limit of around 51 psi and the maximum pressure limit of around 174 psi. As shown in FIG. 2, in the early stage of a brewing a shot, the measured pressure (see line A) is associated with measured flow rates (line C) that are well above the preferred value for the flow rate (line B). During this period of time, there is little or no back pressure from the brewing material, such as a coffee puck, so the minimum pressure limit of 51 psi takes effect and forces a higher flow rate (line C) than would otherwise be allowed based on target flow settings. Accordingly, during the time frame t=0 s to t=6 s, the control 124 controls the pressure of the combined brewing fluid using the proportional valves 134 and 142 based on the simultaneously measured pressure and flow rate so that the pressure does not go outside the range of 51 psi to 138 psi. In addition, the temperature of the brewing liquid is controlled via control of the proportional valves 134 and 142.

At t=6 s (see circle 2), there is a steady decrease in the measured flow rate of the combined fluid. This occurs because the brew material, for example in the form of a coffee puck, is saturating and begins to provide a back pressure. As shown by line C of FIG. 2, the flow rate steadily drops and approaches the target flow rate (line B) at t=9 s. During the time frame t=6 s to t=9 s, the control 124 controls the pressure of the combined brewing fluid using the proportional valves 134 and 142 based on the simultaneously measured pressure and flow rate so that the pressure does not go outside the range of 51 psi to 138 psi. In addition, the flow rate and temperature of the brewing liquid is controlled via control of the proportional valves 134 and 142.

In the example of FIG. 2, when espresso starts to appear in the bottom of the portafilter basket (around t=8.5 s to 9.5 s in the example shown) pre-infusion is considered ended. Dispensing begins when pre-infusion ends, wherein during dispensing incoming water displaces outgoing espresso and the brew process is continuous until the valve 162 is closed.

At t=9 s (circle 3), the measured flow rate agrees with the target flow rate of 1.5 ml/s in the example of FIG. 2. The value of the target flow rate can either be set by user as part of recipe (flow control mode) or calculated for the user in order to achieve a specific target shot time (brew-by-time mode.) Note that while the target flow rate described is for the entire shot, it is possible to adjust the process to take into account different target flow rates associated with different phases of the shot. In addition, while the flow rate achieved in this example is relatively constant and is subject to flow-rate control, there may situations where the target flow would require pressures outside the limits of 51 psi to 138 psi, the system 100 will enforce the pressure to be within the pressure range and will result in the flow rate target being missed for a portion of the extraction phase. Flow rate targets are a function of recipe settings, and in the case of brew-by-time shots, the targets will also change throughout the shot based on how the coffee puck impacts the ability to achieve target at any given moment. Also, target flow rates are subjective depending on the tastes of the customer and so can range from 1 to 5 ml/s, for example.

From t=9 s and onward during the simultaneous extraction of the coffee puck and the dispensing of espresso, the flow rate of the brewing liquid is controlled by control 124 by its control of the proportional valves 134 and 142. Such flow rate control is acceptable, because the measured pressure (line A) is no longer close enough to the minimum limit of 50 psi to be considered a factor. Note that while flow rate is controlled from t=9 s, the pressure, P, and temperature, T, are still being measured and controlled by proportional valves 134 and 142 as explained previously. Regarding the measurement of the pressure P, it is done to monitor when the pressure P nears either of the minimum and maximum limits of 51 psi and 138 psi are being approached. When they are being approached, then the proportional valves 134 and 142 are adjusted so they are avoided while providing acceptable temperature and flow rates. Take for example the situation where the process is towards the end of the shot. In this case, the target flow rate (blue) starts dropping because the shot is on pace to finish a little earlier than intended, but the actual flow rate drops more slowly. This disparity is primarily due to the influence of the pressure limits. In essence, there are two separate rules "fighting" each other, with pressure rules telling the system 100 not to close valves 134, 142 any further, or perhaps to even open them a little, in order to keep the pressure at or above 50 psi, while flow-rate rules are telling the system 100 to close the valves 134, 142 more in order to slow the shot down and finish on-time instead of running fast and finishing early. As the pressure drops closer and closer to the limit 50 psi, the influence of the pressure rules grows stronger, and the difference between the target flow rate and the flow rate that the machine delivers grows correspondingly larger.

Regarding the behavior of the pressure from t=9 s and onwards and without being bound by a particular theory, it is believed that the initial climb in the pressure is because the coffee puck's back-pressure, or resistance to flow, is increasing. This is probably due to a combination of at least two things: 1) fines migration, wherein smaller, dust-size particles of coffee get moved through the coffee bed by the water flow, eventually all pressing against the bottom of the portafilter basket and helping to seal the holes in the basket; and 2) swelling of the cell walls of the coffee grounds, wherein the increase in temperature and pressure results in the water being more able to penetrate the cell walls, enter the cells, and cause each individual cell to swell up a little bit. As to the subsequent decrease in back pressure later, it is believed to be a function of at least two separate factors: 1) the continuous physical removal of material by the dissolving of the coffee mass and carried away by the water; and 2) the softening of the coffee cell walls (mostly cellulose), wherein the initially firm and rigid cell walls are penetrated by the water by osmosis and lead to temporary swelling of the cells followed by softening of the cell walls due to heat and moisture. This softening of the overall structure (both in terms of individual cells and in terms of the piled up coffee mass as a whole) presents less resistance to flow and less back pressure over time. The above factors as well as others and their effect over time affects the pressure curve after the "pre-infusion" phase is completed.

While from the time period of t=0 s to t=6 s, the control 124 essentially controls the pressure, from the time period t=9 s and onwards, the control 124 essentially controls the flow rate of the combined brewing fluid using the proportional valves 134 and 142 based on the simultaneously measured pressure and flow rate so that the pressure does not go outside the range of 51 psi to 138 psi. In addition, the temperature of the brewing liquid is controlled via control of the proportional valves 134 and 142.

As mentioned previously, from the time period t=0 s to t=6 s, the control 124 essentially controls the pressure of the combined fluid directed on the brew material. In another time period from t=9 s and onward, the control 124 essentially controls the flow rate of the combined fluid directed on the brew material. That leaves the middle time period from t=6 s to t=9 s, wherein the flow rate decreases steadily. During the middle time period, the control 124 smoothly/seamlessly transitions from the control of pressure mode (t=0 s to t=6 s) to the control of flow rate mode (t=9 s and onward). The manner the transition is implemented is such that the pre-infusion brewing fluid directed to the brew material/coffee puck is accurate in that it is independent of whether you have a larger or smaller dose, or a shorter or taller portafilter basket.

In summary, the pre-infusion process performed by the system 100 is essentially performed as a function of back pressure from the brew material, such as a coffee puck, instead of a predetermined amount of time. As shown in the example of FIG. 2, the pressure of the combined brewing fluid applied to the brew material/coffee puck begins to ramp up smoothly, gradually at around t=9 s, and when the coffee puck is properly saturated.

Note that the control 124 performs its control of pressure mode, the transition from control of pressure mode to control of flow rate mode, and the control of flow rate mode in a real time manner using the various measurements it receives. Also, it is envisioned that fuzzy logic can be employed for implementing such control since the transition from pressure to flow control is based on proportional membership, not simple Boolean states. Also, keep in mind that while the control 124 is implementing the pre-infusion process shown in FIG. 2, the control 124 is also simultaneously controlling the heating elements 146 and 148 such that fluids at reasonably stable temperatures flow from the low temperature tank 136 and the heat exchanger 148. When the control of the proportional valves 134 and 142 is taken into account, it is apparent that the control 124 also controls the temperature of the combined fluid applied to the brew material. Thus, the control 124 is able to simultaneously control the temperature and pressure of the combined fluid being directed toward the brew material during a first period of time (t=0 s to t=6 s), wherein the simultaneous control of the temperature and the pressure is accomplished by simultaneously controlling a pressure of the fluid coming from the low temperature tank 136 via the proportional valve 134 and a pressure of the fluid coming from the heat exchanger 148 via the proportional valve 142. At a second period of time (t=9 s and beyond), the control 124 also simultaneously controls the temperature and a flow rate of the fluid being directed toward the brew material, wherein the simultaneous controlling the temperature and the flow rate is accomplished by simultaneously controlling a flow rate of the fluid coming from the low temperature tank 136 via the proportional valve 134 and a flow rate of the fluid coming from the heat exchanger via the proportional valve 142.

As mentioned previously, during the first time period (t=0 s to t=6 s) the pressure of the combined fluid directed toward the brew material is initially mostly uncontrolled within the range of 51 psi and 138 psi and so the control 124 controls the proportional valves 134 and 142 during this time frame to essentially control the temperature and pressure of the brewing fluid of mix manifold 150. During the control flow rate mode (t=9 s and onward), the flow rate of the combined fluid directed toward the brew material is at a constant predetermined flow rate, such as approximately 1.5 ml/sec in the example of FIG. 2.

As mentioned previously, it is possible to brew the brewing material, such as the coffee puck, in a brew-by-time mode instead of a flow control mode. Such a brew-by-time mode entails providing a target shot time and target volume instead of a target flow rate. The controller then calculates the required flow rate required to achieve that time/volume combination and tries to achieve it. Throughout the shot, the controller constantly recalculates a new target flow rate, because the target flow rate can't always be achieved. This is because high/low pressure limits inevitably prevent hitting target flow rate during pre-infusion, and sometimes also limit ability to reach target flow rate later in extraction phases as well.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

We claim:

1. A system for controlling disbursement of a fluid to a brew material prior to dispensing of a brewed beverage, the system comprising:

a first fluid supply comprising:
    a first proportional valve; and
    a first storage reservoir of a first fluid that is at a first temperature, wherein the first proportional valve is in fluid communication with the first storage reservoir;

a second fluid supply comprising:
    a second proportional valve; and
    a second storage reservoir of a second fluid that is at a second temperature, wherein the second proportional valve is in fluid communication with the second storage reservoir;

a mix manifold disposed upstream of a brew head, the mix manifold configured to receive and combine the first fluid from the first storage reservoir and the second fluid from the second storage reservoir to generate a fluid that is directed through a delivery path to the brew head and applied to a brew material disposed therein;

a flow sensor disposed along the delivery path at a location between the mix manifold and the brew head, the flow sensor configured to measure a value of flow rate of the fluid after the second fluid have been combined by the mix manifold and before the fluid reaches the first fluid and the brew head;

a temperature sensor disposed along the delivery path at a location between the mix manifold and the brew head, the temperature sensor configured to measure a value of a temperature of the fluid after the first fluid and the second fluid have been combined by the mix manifold and before the fluid is applied to the brew material;

a pressure sensor disposed along the delivery path at a location between the mix manifold and the brew head, the pressure sensor configured to measure a value of a pressure of the fluid after the first fluid and the second fluid have been combined by the mix manifold and before the fluid is applied to the brew material;

a control in electrical communication with the first proportional valve, the second proportional valve, the flow sensor, the temperature sensor, and the pressure sensor, wherein based on the values of the flow rate of the fluid directed toward the brew head, the pressure of the fluid applied to the brew material, and the temperature of the fluid applied to the brew material, the following control process is performed:
    simultaneously controlling temperature and a flow property of the fluid being directed toward the brew material, wherein the simultaneous controlling the temperature and the flow property is accomplished by simultaneously controlling the flow property of the first fluid via the first proportional valve and the flow property of the second fluid via the second proportional valve.

2. The system of claim 1, wherein the brew material comprises coffee grounds.

3. The system of claim 1, wherein the flow property is pressure.

4. The system of claim 1, wherein the flow property is flow rate.

5. The system of claim 1, wherein each of the temperature and the pressure of the fluid is measured and wherein the simultaneous controlling temperature and the flow property of the fluid is based on the measured temperature and the measured pressure.

6. The system of claim 1, wherein the simultaneously controlling temperature and pressure of the fluid being directed toward the brew material is performed during a first period of time, wherein the simultaneous controlling the temperature and the flow property is accomplished by simultaneously controlling a first pressure of the first fluid via the first proportional valve and a second pressure of the second fluid via the second proportional valve; and simultaneously controlling the temperature and a flow rate of the fluid being directed toward the brew material during a second period of time that follows the first period of time, wherein the simultaneous controlling the temperature and the flow rate is accomplished by simultaneously controlling a first flow rate of the first fluid via the first proportional valve and a second flow rate of the second fluid via the second proportional valve;

wherein transition from the simultaneous controlling the temperature and the first flow property to the simultaneous controlling the temperature and the second flow property is performed seamlessly, through a continuously-variable, non-binary, gradual transfer of control.

7. The system of claim 6, wherein the control controls the first proportional valve and the second proportional valve such that during the first time period a pressure of the fluid directed toward the brew material is at a predetermined pressure, and wherein the end of the first time period occurs when the flow rate of the fluid decreases toward a predetermined flow rate.

8. The system of claim 7, wherein the predetermined pressure is approximately 50 psi.

9. The system of claim 6, wherein the control controls the first proportional valve and the second proportional valve such that during the second time period a flow rate of the fluid is constant at a predetermined flow rate.

10. The system of claim 9, wherein the predetermined flow rate is approximately 1.5 ml/sec.

11. The system of claim 6, wherein the control controls the first proportional valve and the second proportional valve such that during the second time period a flow rate of the fluid is constant at a predetermined flow rate.

12. The system of claim 11, wherein the predetermined pressure is approximately 50 psi and the predetermined flow rate is approximately 1.5 ml/sec.

* * * * *